(12) United States Patent
Jakobsmeyer

(10) Patent No.: US 12,331,779 B2
(45) Date of Patent: Jun. 17, 2025

(54) JOINING ARRANGEMENT HAVING A RECEIVER AND A BALL JOINT

(71) Applicant: HELLA GmbH & Co. KG, Lippstadt (DE)

(72) Inventor: Helmut Jakobsmeyer, Paderborn (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 432 days.

(21) Appl. No.: 17/856,694

(22) Filed: Jul. 1, 2022

(65) Prior Publication Data
US 2022/0333637 A1    Oct. 20, 2022

Related U.S. Application Data

(63) Continuation of application No. PCT/EP2020/085095, filed on Dec. 8, 2020.

(30) Foreign Application Priority Data

Jan. 2, 2020   (DE) .................. 10 2020 100 014.6

(51) Int. Cl.
*F16C 11/06*     (2006.01)

(52) U.S. Cl.
CPC .............. *F16C 11/0623* (2013.01)

(58) Field of Classification Search
CPC ... F16C 11/06; F16C 11/0619; F16C 11/0623; F16C 11/0624; Y10T 403/32737; Y10T 403/32713; Y10T 403/32721; B60Q 2200/32
See application file for complete search history.

(56) References Cited

U.S. PATENT DOCUMENTS

| | | | |
|---|---|---|---|
| 6,206,604 B1 * | 3/2001 | Dembowsky | F16B 21/075 403/135 |
| 6,692,176 B1 * | 2/2004 | Fladhammer | F16C 11/0695 403/135 |
| 6,837,716 B1 | 1/2005 | Brazas | |

(Continued)

FOREIGN PATENT DOCUMENTS

| | | | |
|---|---|---|---|
| DE | 102005007119 A1 * | 9/2006 | ............... B60Q 1/06 |
| DE | 102013102197 A1 | 9/2013 | |

(Continued)

OTHER PUBLICATIONS

International Search Report dated Mar. 12, 2021 in corresponding application PCT/EP2020/085095.

*Primary Examiner* — Jonathan P Masinick
(74) *Attorney, Agent, or Firm* — Muncy, Geissler, Olds & Lowe, P.C.

(57) ABSTRACT

The present invention relates to a joining arrangement having a receiver with a receiving opening and having a ball joint which is spread open into the receiver, wherein the ball joint comprises a joint pin with a joint ball and a joint socket for receiving the joint ball, wherein the joint socket has at least two wings with in each case one internally situated joint surface, wherein the joint surfaces are in contact with the joint ball and enclose the joint ball in sections. According to the invention, the wings have in each case one reboundable resilience section by means of which the respective joint surface presses with a defined force onto the joint ball.

10 Claims, 4 Drawing Sheets

(56) References Cited

U.S. PATENT DOCUMENTS

| | | | |
|---|---|---|---|
| 7,963,715 B2 * | 6/2011 | Burton | F16C 11/0657 |
| | | | 403/135 |
| 9,140,294 B2 * | 9/2015 | Burton | F16C 11/069 |
| 9,995,331 B2 | 6/2018 | Heimann et al. | |
| 10,570,942 B2 * | 2/2020 | Metten | F16C 11/0657 |
| 11,067,117 B2 * | 7/2021 | Recker | F16C 11/0657 |
| 11,149,785 B2 * | 10/2021 | Fladhammer | F16C 11/0623 |
| 2013/0236238 A1 | 9/2013 | Burton | |
| 2019/0128319 A1 | 5/2019 | Paerewyck et al. | |
| 2022/0349441 A1 * | 11/2022 | Japs | F16C 11/0695 |
| 2023/0235779 A1 * | 7/2023 | Hirano | F16C 11/0623 |
| | | | 403/119 |

FOREIGN PATENT DOCUMENTS

| | | | | |
|---|---|---|---|---|
| DE | 202015101103 U1 | 6/2016 | | |
| DE | 102017006742 A1 * | 1/2018 | | |
| EP | 1850017 A2 | 10/2007 | | |
| EP | 1977862 A2 | 10/2008 | | |
| EP | 3015327 A1 * | 5/2016 | | B60T 11/18 |
| EP | 3299642 A1 | 3/2018 | | |
| EP | 3346148 A1 | 7/2018 | | |
| EP | 3587183 A1 * | 1/2020 | | |
| WO | WO2016046488 A1 | 3/2016 | | |

\* cited by examiner

JOINING ARRANGEMENT HAVING A RECEIVER AND A BALL JOINT

This nonprovisional application is a continuation of International Application No. PCT/EP2020/085095, which was filed on Dec. 8, 2020, and which claims priority to German Patent Application No. 10 2020 100 014.6, which was filed in Germany on Jan. 2, 2020, and which are both herein incorporated by reference.

BACKGROUND OF THE INVENTION

Field of the Invention

The present invention relates to a joining arrangement having a receiver with a receiving opening and having a ball joint which is spread open into the receiver, wherein the ball joint comprises a joint pin with a joint ball and a joint socket for receiving the joint ball, wherein the joint socket has at least two wings with in each case one internally situated joint surface, wherein the joint surfaces are in contact with the joint ball and enclose the joint ball in sections.

Description of the Background Art

A joint in which the joint head has a spherical shape is referred to as a ball joint, wherein the counterpart, which encloses the head to varying degrees depending on the joint, is called the joint socket. Due to this geometry, a ball joint can in principle be rotated in three axes, wherein translational movements are not possible. The joint head is designed, for example, as a joint ball on a cylindrical joint pin.

Ball joints are used, for example, in the assembly of vehicle lighting devices, where they are used, for instance, to attach a light module to a support frame. For this purpose, the joint pin is preferably designed as a ball screw which can be screwed to the light module to be mounted, and the joint socket is connected to the support frame, in particular resiliently spread open into a corresponding receiving opening of a receiver, which is also referred to as an interface. As a result, the light module is locked in a desired position on the support frame, but remains pivotable due to the rotational degrees of freedom of the ball joint such that fine adjustment of the light module in relation to further optical components, for example, a lens, is possible in order to generate a desired light impression of the vehicle lighting device.

For example, EP 3 299 642 A1 discloses a vehicle headlight comprising a ball joint, a light module, and a support frame, wherein the ball joint connects the support frame to the light module or to a support unit located on the vehicle side, wherein the ball joint is rotatable in a longitudinal position.

A critical variable in practice is the adjustment torque as a measure of the clamping effect, i.e., the torque which must act on a contact point of the joint pin for rotating the joint ball. On the one hand, it must be ensured that the received light module cannot be significantly deflected from its factory-adjusted target position by vibrations, accelerations, or temperature fluctuations occurring during driving. On the other hand, there must be sufficient mobility of the ball joints to enable an error-free assembly and adjustment process. It must also be taken into account that additional contributions to the adjustment torque are made by manufacturing and assembly tolerances. Because light modules are usually attached to the support frame by means of a plurality of ball joints, the interaction of such dimensional tolerances can result in significant effects.

SUMMARY OF THE INVENTION

It is therefore an object of the present invention to provide propose a refinement of a joining arrangement having a receiver with a receiving opening and having a ball joint which is spread open into the receiver, wherein the ball joint comprises a joint pin with a joint ball and a joint socket for receiving the joint ball, wherein the joint socket has at least two wings with in each case one internally situated joint surface, wherein the joint surfaces are in contact with the joint ball and enclose the joint ball in sections, wherein in particular there is the possibility of influencing the adjustment torque.

The invention includes the technical teaching that the wings have in each case one reboundable resilience section by means of which the respective joint surface presses with a defined force onto the joint ball.

The invention is based on the idea of influencing the adjustment torque via the contact pressure on the joint ball, wherein the contact pressure is determined by the defined force which the reboundable resilience section exerts on the joint ball. For this purpose, the resilience section is received in a gap between the joint ball and the receiver and compressed according to the size of the gap, as a result of which a corresponding elastic tension is built up. The size of the defined force can be determined by specific dimensioning of the size of the gap, preferably via a corresponding design of the receiver. The resilience of the resilience section is realized by its geometry, for example, by a multi-angled shape in the manner of a compressible spring.

Thus, according to the invention, it is possible to adapt the adjustment torque of the joint pin of the ball joint in the joining arrangement as required, i.e., for example, to the weight of a light module to be received thereon and/or to customer-specific specifications with regard to the assembly properties, for example, hysteresis-free adjustability.

The receiver can have a support surface circumferentially adjacent to the receiving opening, wherein the resilience section interacts with the support surface. The interaction comes about in particular through direct physical contact between the support surface and the resilience section, such that the resilience section is thereby compressed between the support surface and the joint ball. In particular, the defined force can be preselected by selecting the dimensions of the receiving opening, for example, by selecting the diameter in the case of a round receiving opening. The smaller the diameter of the receiving opening and thus of the annular support surface adjacent thereto, the more the resilience section of the wings running between the support surface and the joint ball is compressed, i.e., the greater the contact pressure on the joint ball, which results in an increase in the clamping effect and the adjustment torque.

Preferably, the joint socket can have at least two locking arms which are spread open into the receiver. The locking arms are pushed through the receiving opening in the course of setting up the joining arrangement, and then the joint pin with the joint ball is pushed into the joint socket, wherein the joint socket is spread open and the locking arms engage in the receiver.

In particular, the receiver can have a locking collar circumferentially surrounding the receiving opening on the rear side, wherein the locking arms are spread open into the locking collar.

With further advantage, the locking arms can each comprise a locking lug, wherein the locking lugs in each case have one internally situated joint surface, wherein the joint surfaces of the locking lugs are in contact with the joint ball and enclose the joint ball in sections. The joint surfaces of the locking lugs thus form a rear section of the socket bearing for the joint ball. The function of the locking lugs is also to form a secondary locking mechanism for the joining arrangement, such that the joint socket can no longer be pulled out of the receiver after the joint ball has been received.

In a further advantageous embodiment, the wings in each case can have at least one spring element on the rear side, wherein the spring elements are in contact with an end face, surrounding the receiving opening, on the receiver. The spring elements serve to compensate for axial manufacturing tolerances by being compressible to varying degrees. Unwanted contributions to the adjustment torque in particular are prevented by such a tolerance compensation.

Preferably, the joint pin can be formed as a ball screw with a threaded section. Thus, a light module or other component can be received on the joining arrangement of the invention by means of a screw connection.

The invention further relates to a vehicle lighting device having a light module and a support frame, wherein the light module is received on the support frame by means of a joining arrangement of the invention in one of the aforementioned embodiments.

In addition, the invention relates to a method for mounting a light module on a support frame of a vehicle lighting device, wherein a joining arrangement of the invention in one of the aforementioned embodiments is designed to receive the light module on the support frame, wherein the defined force with which the joint surfaces of the wings press on the joint ball is preselected. Preferably, the defined force is preselected by selecting the dimensions of the receiving opening.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1A:
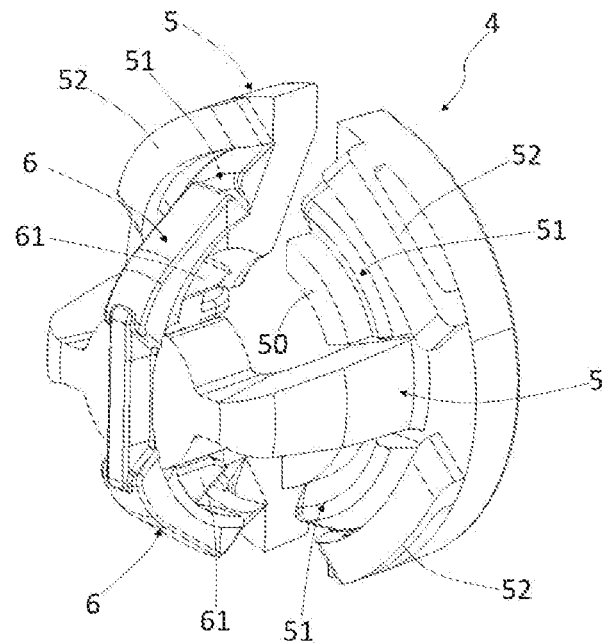
FIGS. 1a to 1d show perspective views of a joint socket for a joining arrangement of the invention.
Figure 1B:
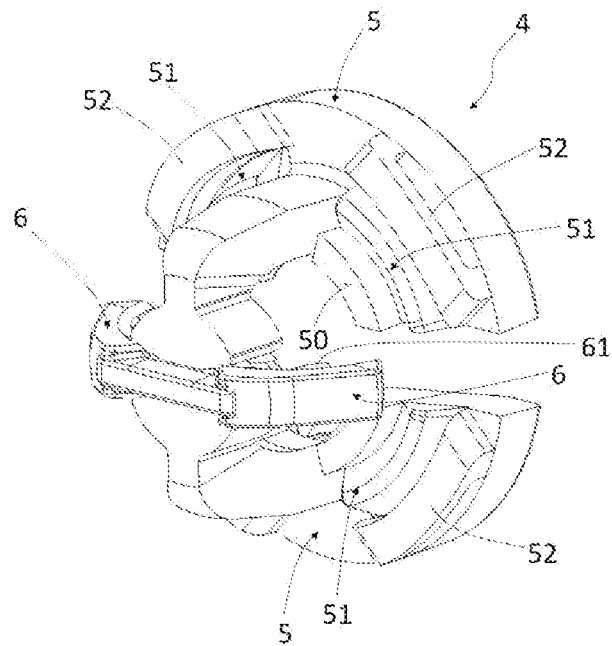
Figure 1C:
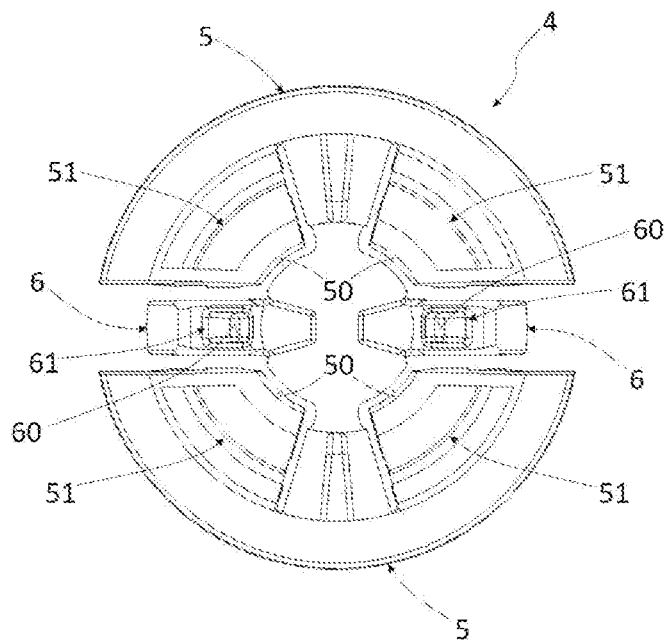
Figure 1D:
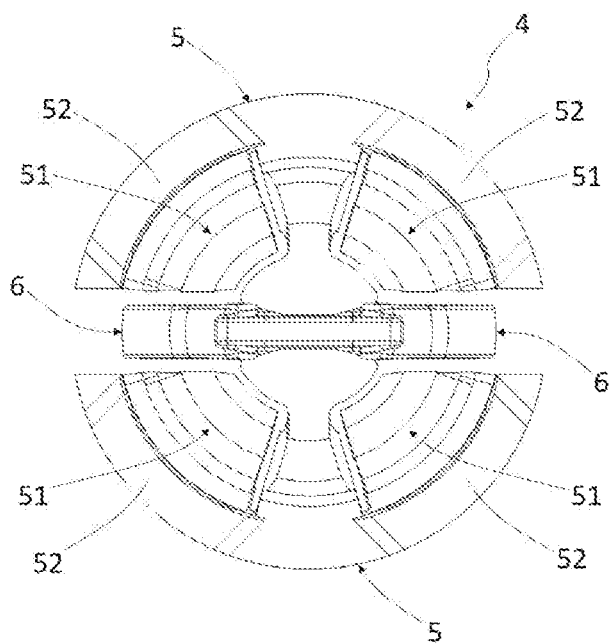

FIGS. 1a to 1d show perspective views of a joint socket 4 for a joining arrangement of the invention, wherein joint socket 4 comprises the two wings 5 and the two locking arms 6. The division into two wings 5, each tapering at the rear to form an arm, determines the spreadability of joint socket 4 to receive the joint ball of a joint pin. Joint socket 4 consists, for example, of a thermoplastic, for instance, polyproxyethylene (PON), and is advantageously manufactured by means of an injection molding process.

The two wings 5 each comprise two resilience sections 51 of the invention, which extend from the circumference of joint socket 4 in the direction of the receiving opening for the joint ball. At the internally situated end section of resilience sections 51, joint surfaces 50 are formed, which have a curved contour corresponding to a spherical segment and are provided for contact with the joint ball. The reboundable resilience of resilience sections 51 is provided by their geometric design. Thus, resilience sections 51 have a multi-angled, approximately Z-shaped cross-section and can therefore be compressed by a compressive load comparable to a spring element. Such a compressive load occurs in particular because in a joining arrangement of the invention, resilience sections 51 are clamped between a joint ball received in joint socket 4 and a support surface on the receiver. In this case, the knee-shaped projection of resilience sections 51 is provided for contact with the support surface on the receiver side.

Furthermore, the two wings 5 each comprise two spring elements 52, arranged on the rear side, in the form of bracket-like projections, which are provided for attachment to the receiver in a joining arrangement of the invention. Spring elements 52 make possible an axial tolerance compensation when the ball joint is mounted in the receiver.

The two locking arms 6 are used to engage joint socket 4 in the receiver. Locking arms 6 interact with the joint ball via joint surfaces 60 formed on locking lugs 61 and are spread open by the latter in the joining arrangement.

Figure 2:
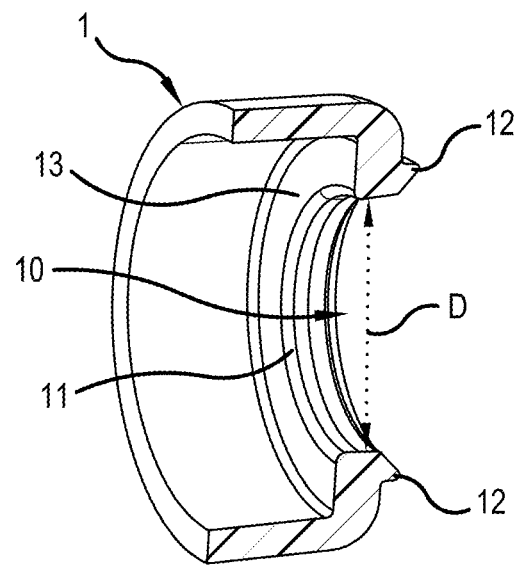
FIG. 2 shows a perspective cross-sectional view of a receiver for a joining arrangement of the invention.

FIG. 2 shows a perspective cross-sectional view of a receiver 1 for a joining arrangement of the invention. Receiver 1 has an approximately cup-shaped form with a receiving opening 10, which is circular here by way of example and which serves to receive the joint socket of the associated ball joint. At the front, receiving opening 10 abuts support surface 11, which circumferentially surrounds receiving opening 10 and is provided to interact with the resilience sections of the ball joint. The front annular end face 13 is used for the contact of the spring elements of the joint socket. According to the invention, the dimension D of receiving opening 10, shown here as the diameter, can be appropriately preselected to effect a desired degree of compression of the resilience sections and thus to exert a defined force on the received joint ball. Further, receiver 1 comprises locking collar 12 which circumferentially surrounds receiving opening 10 on the rear side and into which the locking arms of the ball joint are spread open during assembly of the joining arrangement of the invention.

Figure 3A:
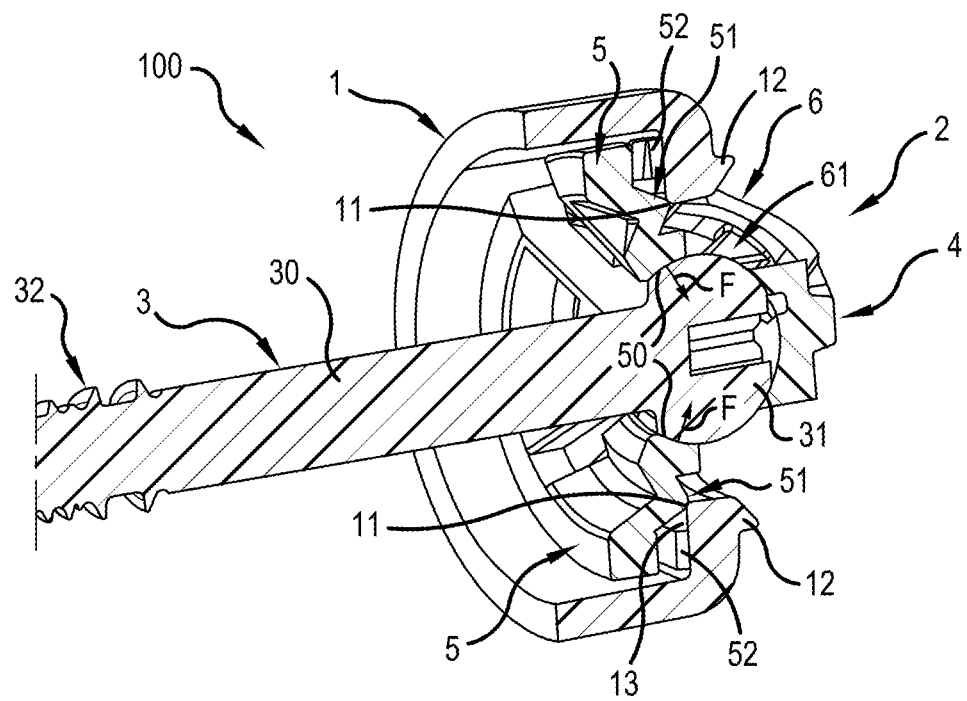
FIGS. 3a and 3b show perspective cross-sectional views of a joining arrangement of the invention.
Figure 3B:
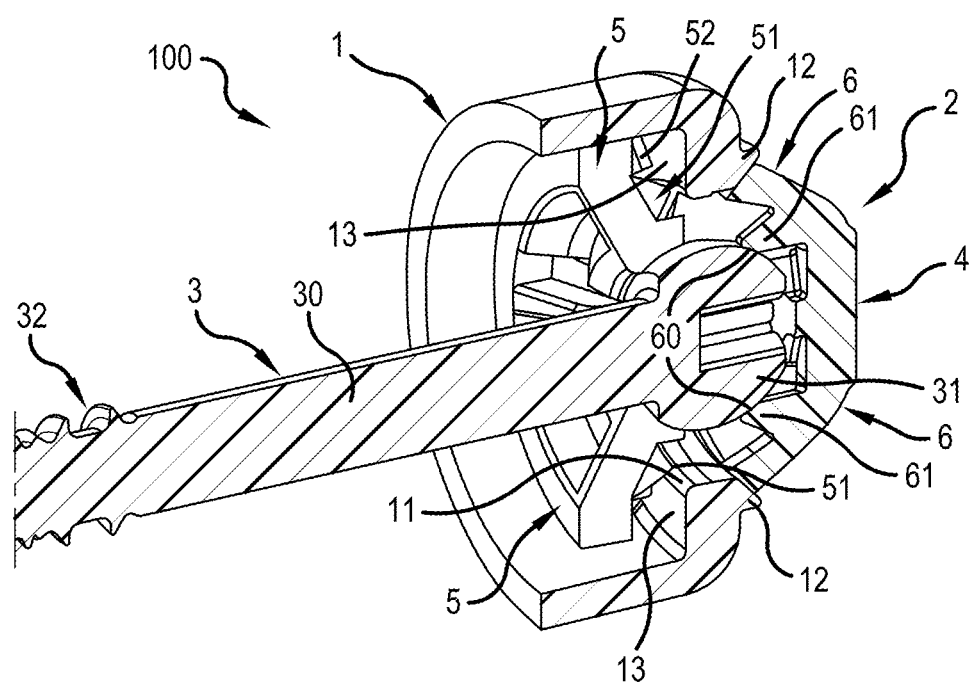

FIGS. 3a and 3b show perspective cross-sectional views of a joining arrangement 100 of the invention with a ball joint 2 which is spread open into receiver 1. Joint pin 3, designed as a ball screw 30 with threaded section 32, is received in joint socket 4, wherein, in terms of the process, joint socket 4 is first inserted into receiving opening 10 on receiver 1 and joining arrangement 100 then comes about by pushing joint pin 3 or joint ball 31 into joint socket 4. When joint ball 31 is pushed into joint socket 4, both the two wings 5 and the two locking arms 6 are spread apart, as a result of which resilience sections 51 interact with support surface 11 on receiver 1 and locking arms 6 engage in locking collar 12.

Contact with support surface 11 occurs in the region of the circumferential, knee-shaped projection of resilience sections 51, wherein compression of resilience sections 51 occurs and the defined force F results with which joint surfaces 50 are pressed onto joint ball 31. This force F is essential for the frictional resistance which must be overcome to turn joint pin 3, and is thus essential for the adjustment torque. The extent of the compression of resilience sections 51 and thus of the resulting defined force F on joint ball 31 can be specified by suitable preselection of the diameter of receiving opening 10 and thus of the dimensions of the circumferential support surface 11. The smaller the diameter of receiving opening 10 and thus of the annular support surface 11 adjacent thereto, the more resilience sections 51 of wings 5, extending between support surface 11 and joint ball 31, are compressed, i.e., the greater the contact pressure on joint ball 31, which results in an increase in the clamping effect and the adjustment torque. The knee-shaped projection, circumferentially surrounding resilience sections 51, and support surface 11 preferably form an inclined contact surface as shown, i.e., that the plane normal of the contact surface has non-vanishing axial components, such that when joint ball 31 is pushed into joint socket 4 prepositioned in receiving opening 10, the projection of resilience section 51 can slide along support surface 11 continuously and with increasing compression up to an end position. In addition to varying the adjustment torque by preselecting the diameter of receiving opening 10 on receiver 1, joining arrangement 100 of the invention can also be used in this way to compensate for radial tolerances caused by assembly and/or manufacturing.

The clamping effect of joint socket 4 on joint ball 31 via joint surfaces 50 and 60 can also be undesirably influenced by dimensional tolerances in the axial direction. The bracket-shaped spring elements 52, which rest against the front end face 13 around receiving opening 10 on receiver 1, serve to compensate for such axial tolerances. When joining arrangement 100 is set up, i.e., when joint ball 31 is pushed into joint socket 4, spring elements 52 are compressed accordingly and locking arms 6 slide along the slanted contact surface on locking collar 12 up to their final locking position. The additional locking lugs 61 provide a secondary locking of ball joint 2, so that joint socket 4 cannot be pulled out of receiver 1 when joint ball 31 is engaged.

The invention is not limited in its implementation to the preferred exemplary embodiment described above. Rather, a number of variants are conceivable which make use of the shown solution even in the case of fundamentally different embodiments. All features and/or advantages arising from the claims, the description, or the drawings, including structural details, spatial arrangements, and method steps, can be essential to the invention both individually and in a wide variety of combinations.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A joining arrangement comprising:
   a receiver with a receiving opening; and
   a ball joint which is spread open into the receiver, the ball joint comprising a joint pin with a joint ball and a joint socket for receiving the joint ball,
   wherein the joint socket has at least two wings, each of the at least two wings having a reboundable resilience section with an internally situated joint surface,
   wherein each of the joint surfaces are in contact with the joint ball and enclose the joint ball in sections,
   wherein each of the joint surfaces press onto the joint ball with a defined force, and
   wherein at least one wing of the at least two wings has at least one spring element on a rear side, and wherein the at least one spring element is in contact with an end face of the receiver that surrounds the receiving opening.

2. The joining arrangement according to claim 1, wherein the receiver has a support surface circumferentially adjacent to the receiving opening, and wherein each of the resilience sections interact with the support surface.

3. The joining arrangement according to claim 2, wherein the defined force is preselected by selecting a dimension of the receiving opening.

4. The joining arrangement according to claim 1, wherein the joint socket has at least two locking arms which are spread open into the receiver.

5. The joining arrangement according to claim 4, wherein the receiver has a locking collar circumferentially surrounding the receiving opening on a rear side, and wherein the at least two locking arms are spread open into the locking collar.

6. The joining arrangement according to claim 4, wherein each of the at least two locking arms comprise a locking lug, wherein the locking lugs each have one internally situated joint surface, and wherein the joint surfaces of the locking lugs are in contact with the joint ball and enclose the joint ball in sections.

7. The joining arrangement according to claim 1, wherein the joint pin is formed as a ball screw with a threaded section.

8. A vehicle lighting device comprising a light module and a support frame, wherein the light module is received on the support frame by the joining arrangement according to claim 1.

9. A method for mounting a light module on a support frame of a vehicle lighting device, wherein the joining arrangement according to claim 1 is configured to receive the light module on the support frame, wherein the defined force with which the joint surfaces of the at least two wings press on the joint ball is preselected.

10. The method according to claim 9, wherein the defined force is preselected by selecting a dimension of the receiving opening.

* * * * *